July 19, 1932.  J. DRAHER ET AL  1,868,226
BIAS STRIP CUTTING MACHINE
Filed May 16, 1930    5 Sheets-Sheet 1

Inventors
John Draher
William B. Runk
By their Attorney
H. G. Manning

July 19, 1932.   J. DRAHER ET AL   1,868,226
BIAS STRIP CUTTING MACHINE
Filed May 16, 1930   5 Sheets-Sheet 4

John Draher  Inventors
William B. Runk
By their Attorney
H. G. Manning

July 19, 1932.  J. DRAHER ET AL  1,868,226
BIAS STRIP CUTTING MACHINE
Filed May 16, 1930   5 Sheets-Sheet 5
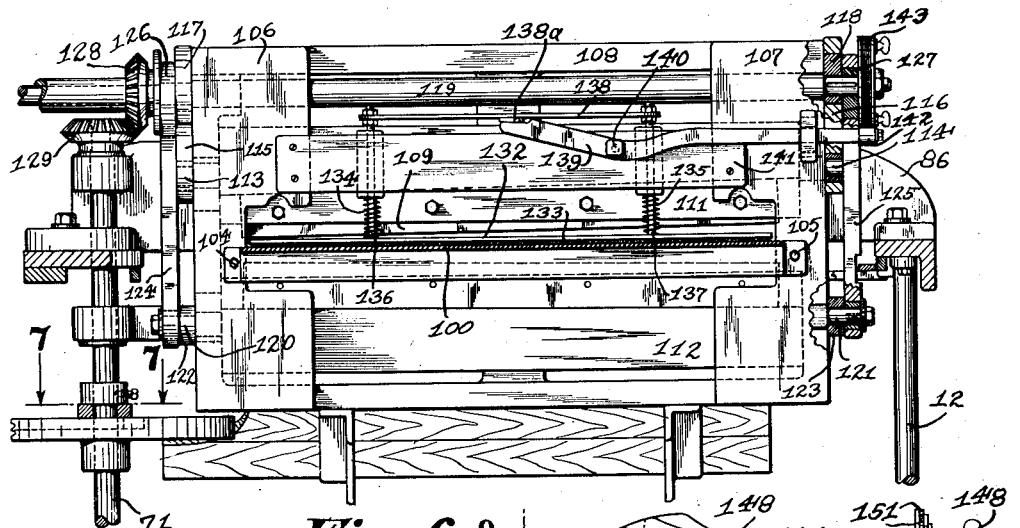
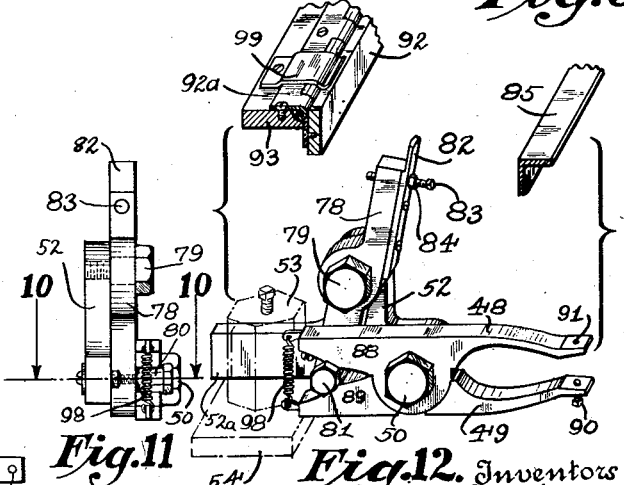
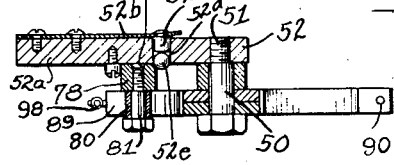

Patented July 19, 1932

1,868,226

UNITED STATES PATENT OFFICE

JOHN DRAHER AND WILLIAM B. RUNK, OF WATERBURY, CONNECTICUT, ASSIGNORS TO BIAS CUTTING MACHINE CORPORATION, OF WATERBURY, CONNECTICUT, A CORPORATION OF NEW YORK

BIAS STRIP CUTTING MACHINE

Application filed May 16, 1930. Serial No. 453,067.

This invention relates to strip-cutting machines, and more particularly to a machine of this nature in which a plurality of superposed cloth strips are simultaneously cut into short lengths in the shape of oblique parallelograms.

One object of this invention is to provide a machine of the above nature having means for varying the angle or bias at which the lengths are cut from the strips.

A further object is to provide a machine of the above nature having improved strip-feeding mechanism, cutting mechanism, and grip and stripper mechanism.

A further object is to provide a machine of the above nature which will be relatively simple in construction, inexpensive to manufacture, practically fool-proof in operation, easy to install and manipulate, compact, and very efficient and durable in use.

With these and other objects in view, there has been illustrated on the accompanying drawings one form in which the invention may be conveniently embodied in practice.

In the drawings:

Fig. 6 is a sectional rear elevation of the machine, taken along the line 6—6 of Fig. 1, certain parts being broken away for clearness.

Fig. 7 is an enlarged horizontal sectional view of the main feed-operating cam, the section being taken along the line 7—7 of Fig. 6.

Fig. 8 is an enlarged horizontal view of the adjustable cam for operating the stripper and grip bar.

Fig. 9 is a sectional view in elevation, taken along the broken line 9—9 of Fig. 8.

Fig. 10 is a horizontal sectional view of the grip finger mechanism, taken along the line 10—10 of Fig. 11.

Fig. 11 is a vertical end view of the sheet-clamping finger grip mechanism.

Fig. 12 is a perspective view of one of the finger grip mechanisms, and a fragmentary view of the means for closing and releasing said mechanism.

Figure 1:
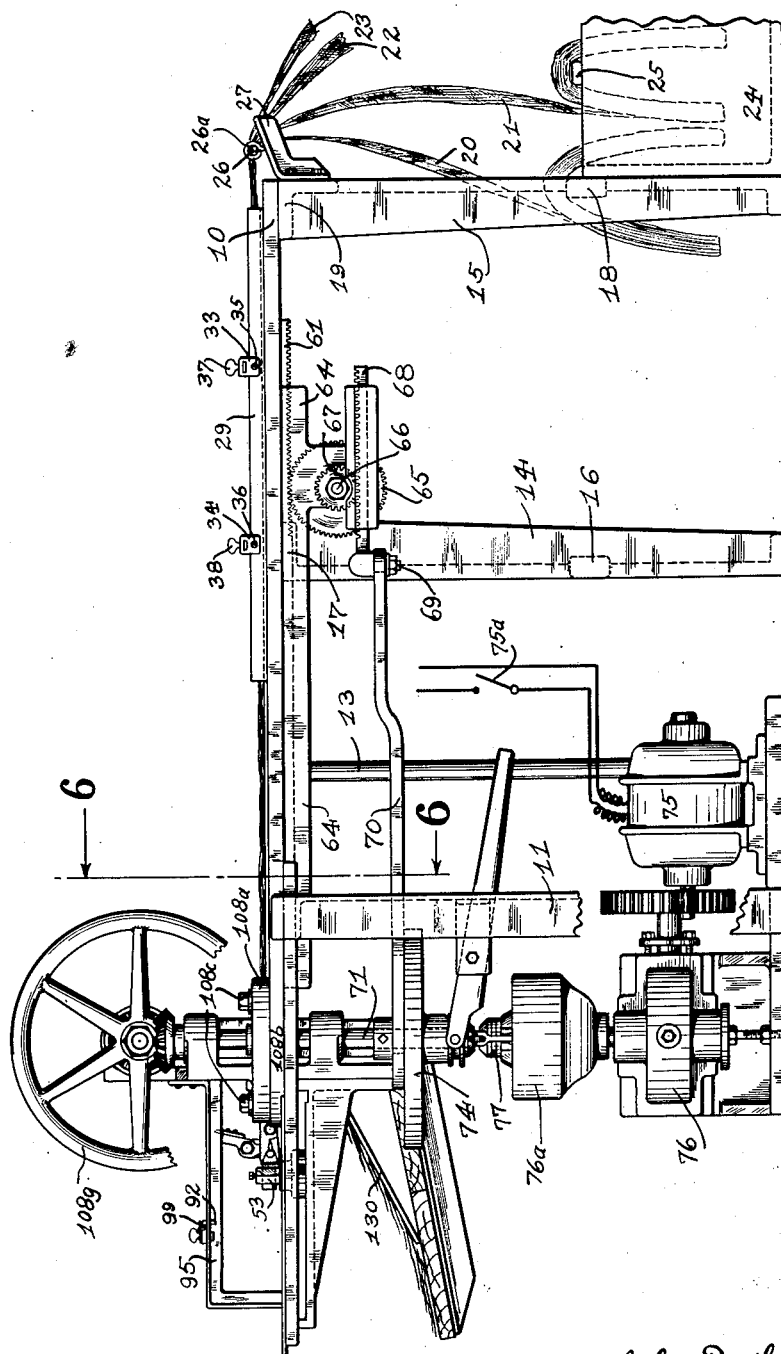
Fig. 1 represents a side elevation of the strip-cutting machine, the switch for controlling the motor being shown in diagram.

Referring now to the drawings in which like reference numerals denote corresponding parts throughout the several views, the numeral 10 indicates a main work table supported by a front angle leg 11, a front rod 12, an intermediate rod 13, and two pairs of rear legs 14, 14, and 15, 15. The bottoms of the legs 14, 14 are connected together by a cross-bar 16 and at their upper ends by a horizontal member 17. The rear legs 15 are similarly connected by a lower cross-bar 18 and a top angle member 19.

Strip feeding mechanism

The strip material, herein shown in Fig. 1 as a plurality of silk bolts 20, 21, 22, 23, is fed upwardly from a receptacle 24, preferably rectangular in shape, the foremost bolt 20 being supported at its mid-point by the bar 18, and the remainder of said bolts 21, 22, and 23 by horizontal bars 25, resting upon the top of the receptacle 24.

Figure 3:
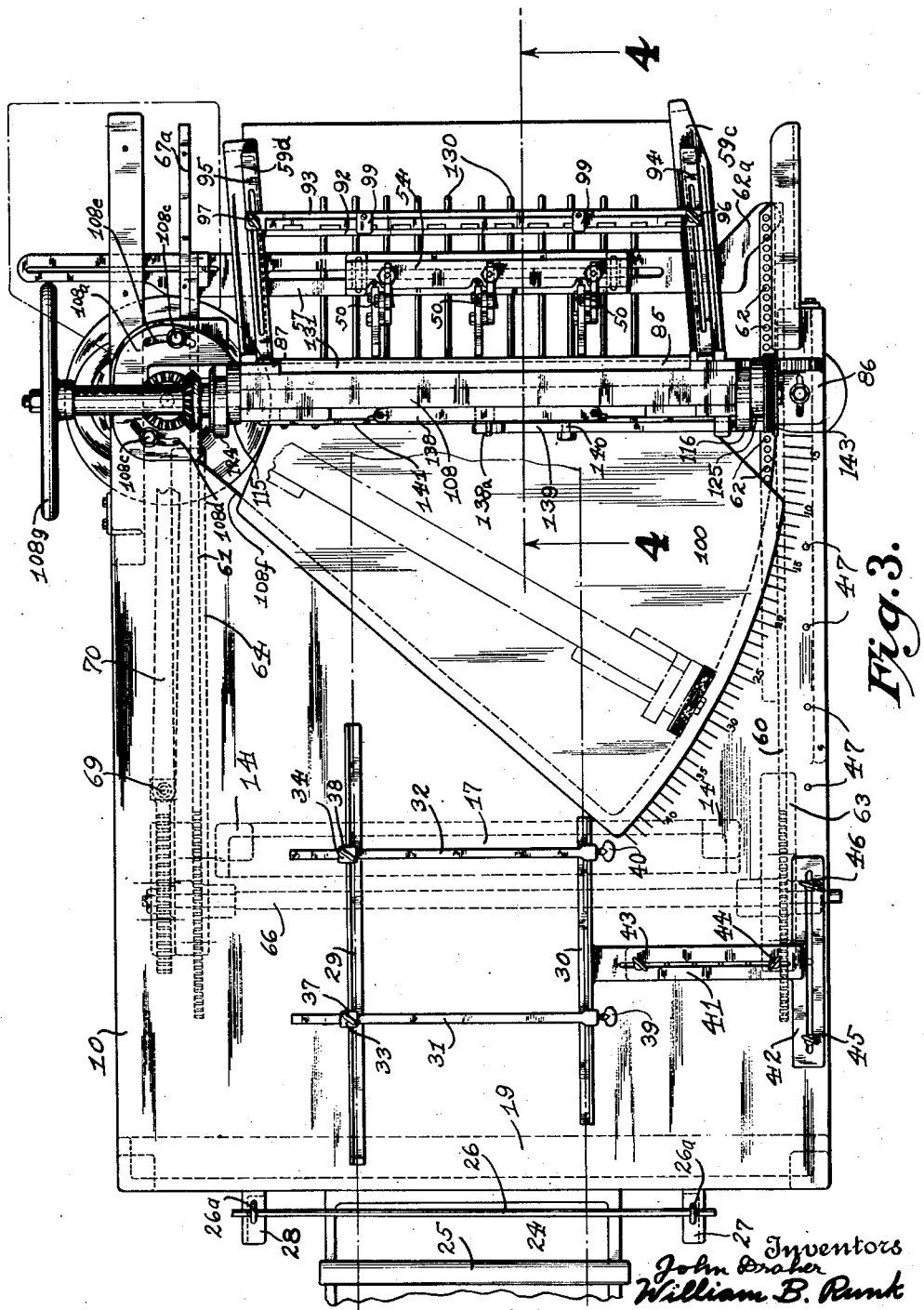
Fig. 3 is a top plan view of the machine as it appears when adjusted to cut the strips at right-angles to the length thereof.

As most clearly shown in Figs. 1 and 3, the bolts 20, 21, 22, and 23 are adapted to be gathered together and guided forwardly by an elongated rod 26 of small diameter, said rod being loosely carried by a pair of eyes 26a extending upwardly from a pair of angle brackets 27 and 28, respectively, secured on the angle member 19, said guiding rod 26 being preferably positioned just above the table 10. After passing over the guiding rod 26, the strips are guided in their forward travel along the table 10 by a frame comprising a pair of longitudinal angle members 29 and 30, adjustably connected together by a pair of transverse bars 31 and 32 which are clamped to said angle member 29 by clips 33 and 34 held in place as by set screws 35 and 36 and thumb screws 37 and 38.

The ends of the transverse bars 31 and 32 opposite from the clips 33 and 34 are adapted to be adjustably clamped to the longitudinal angle member 30 as by thumb screws 39 and 40. By means of this construction, the positions of the angle members 29 and 30 and the transverse bars 31 and 32 may be changed at the will of the operator according to the width of the strip being cut.

The angle member 30 has attached thereto a transverse slotted plate 41 which is adapted to be adjustably secured in any desired lateral position upon a T-plate 42 by means of a pair of thumb screws 43 and 44. The longitudinal portion of the T-plate 42 is also slotted and is adapted to be selectively attached at any desired adjusted position along the table 10 by thumb screws 45 and 46 which are adapted to fit any of a series of tapped holes 47 located adjacent the edge of the table 10.

In order to intermittently pull the plurality of superposed strips 20, 21, 22, and 23 forwardly along the table 10 between the guide members 29 and 30, provision is made of a plurality, three in this instance, of sets of sheet-clamping finger grips, as most clearly shown in Figs. 10 to 12. Each set of finger grips comprises a pair of curved jaws 48 and 49 hingedly connected together by studs 50 having reduced threaded ends 51 screwed into the ends of a supporting member 52 having a forward extension 52a rigidly secured in a post 53. The supporting bracket 52 carries a resilient spring clip 52b having a button 52c at its free end adapted to slidably fit within a hole 52d. A ball 52e is located in the inner end of said hole 52d and engages the lower curved end section 52f of a rocker arm 78 to be hereinafter described. The posts 53, three in number, are carried by a transverse raised supporting plate 54 having depending feet 55 and 56 adapted to rest upon a slotted rack-fed cross-bar 57, said feet being attached thereto by bolts 58 and 59.

The cross-bar 57 is guided for longitudinal reciprocation within slots 59a and 59b formed in a pair of forwardly extending frames 59c and 59d and is connected with a pair of horizontal feed racks 60 and 61 located beneath the table 10. The feed rack 60 is provided with a series of spacing apertures 62 for permitting the cross-bar 57 to be adjusted into parallelism with the cutting mechanism. The cross-bar 57 has an inclined apertured extremity 62a carrying a slidable depending lock shaft 62b, the latter having a horizontal pin 62c adapted to be pulled upwardly at all times by a pair of springs 62d connected to a second pin 62e carried by a collar 62f on said inclined extremity 62a. By means of this construction, the lock shaft will be detachably held in any one of the apertures 62 according to the angle at which the strips are being cut.

As most clearly shown in Figs. 1 and 3, the feed racks 60 and 61 are guided by longitudinal housings 63 and 64, and said racks are adapted to mesh with a pair of gears 65 located therebeneath mounted on a transverse shaft 66 carrying a pinion 67. The feed rack 61 is also guided by a forwardly extending bar 67a. The pinion 67 meshes with a short auxiliary horizontal rack 68 pivotally connected by a bolt 69 to a pitman rod 70, the forward end of which is slotted for slidably fitting over a vertical main drive shaft 71 (see Fig. 7).

In order to cause the pitman rod 70 to reciprocate, the extremity of said rod carries a roller 72 which travels within a circular track 73 eccentrically located within a horizontal rack feed-operating main cam 74, which is driven by the shaft 71. The shaft 71 receives power from a motor 75 controlled by a switch 75a and said motor is detachably connected to said shaft 71 by a speed-reducing unit 76, universal joint 76a and a friction clutch 77.

In order to cause the curved jaws 48 and 49 of the finger grips to clamp upon the sheets 20, 21, 22, and 23 at the desired times, provision is made of rocker arms 78 pivoted on studs 79 mounted in the supporting arms 52 and having laterally disposed rollers 80 secured to the lower end thereof, as by recessed studs 81. The upper end of each rocker arm 78 has a thin overhanging substantially vertical strip-releasing tongue 82 secured thereto and a substantially horizontal projecting set screw 83 held in place by a lock nut 84.

*Operation of the strip feeding mechanism*

As the finger grip-carrying cross-bar 57 is moved rearwardly by the action of the cam-driven pitman rod 70 and the feed racks 68, 60 and 61, the set screws 83 will strike the vertical portion of a transverse locking angle bar 85 secured at its ends to a pair of upright cutter-housing support brackets 86 and 87. This causes the rocker arms 78 to simultaneously rotate about their fulcra and force the rollers 80 between the diverging forward ends 88 and 89 of the finger grip jaws 48 and 49, causing the rounded points of the set screws 90 on the lower jaws 49 to press the strips 20, 21, 22, and 23 into recesses 91 formed in the upper jaws 48, thereby securely clamping said strips.

The finger grips will then be carried forward by the action of the rack feed-operating main cam 74 until the overhanging tongues 82 strike a safety tripping bar 92, pivotally secured as by an elongated hinge 92a to a horizontal main support bar 93, the latter being adjustably mounted at its ends in a pair of forwardly extending slotted L-shaped brackets 94 and 95, thumb screws 96 and 97 being provided to secure said bar 93 in adjusted position. The rocker arm rollers 80 will thus be caused to move out from the diverging forward ends 88 and 89 of the finger grip jaws 48 and 49 permitting the equalizing coil spring 98 to open said jaws and release the strips therefrom.

By means of this construction it will be understood that in case the rocker arms 78 should accidentally pass completely under the hinged safety tripping bar 92 and should thereafter be swung to vertical position, no injury will be done to the mechanism because, when the rocker arms again move rearwardly, the tripping bar 92 will merely be swung upwardly upon its hinge 92a and be restored to its normal position, as by spring clips 99.

The spring clips 52b and the balls 52e serve to hold the rocker arms in their inclined positions with the jaws 48 and 49 tightly clamping the strips 20, 21, 22, and 23 until said arms engage the tripping bar 92. The rocker arms are held in their upright positions by the seating of the balls 52e in the ends of the recessed studs 81.

*Strip cutter mechanism*

Figures 4, 5:
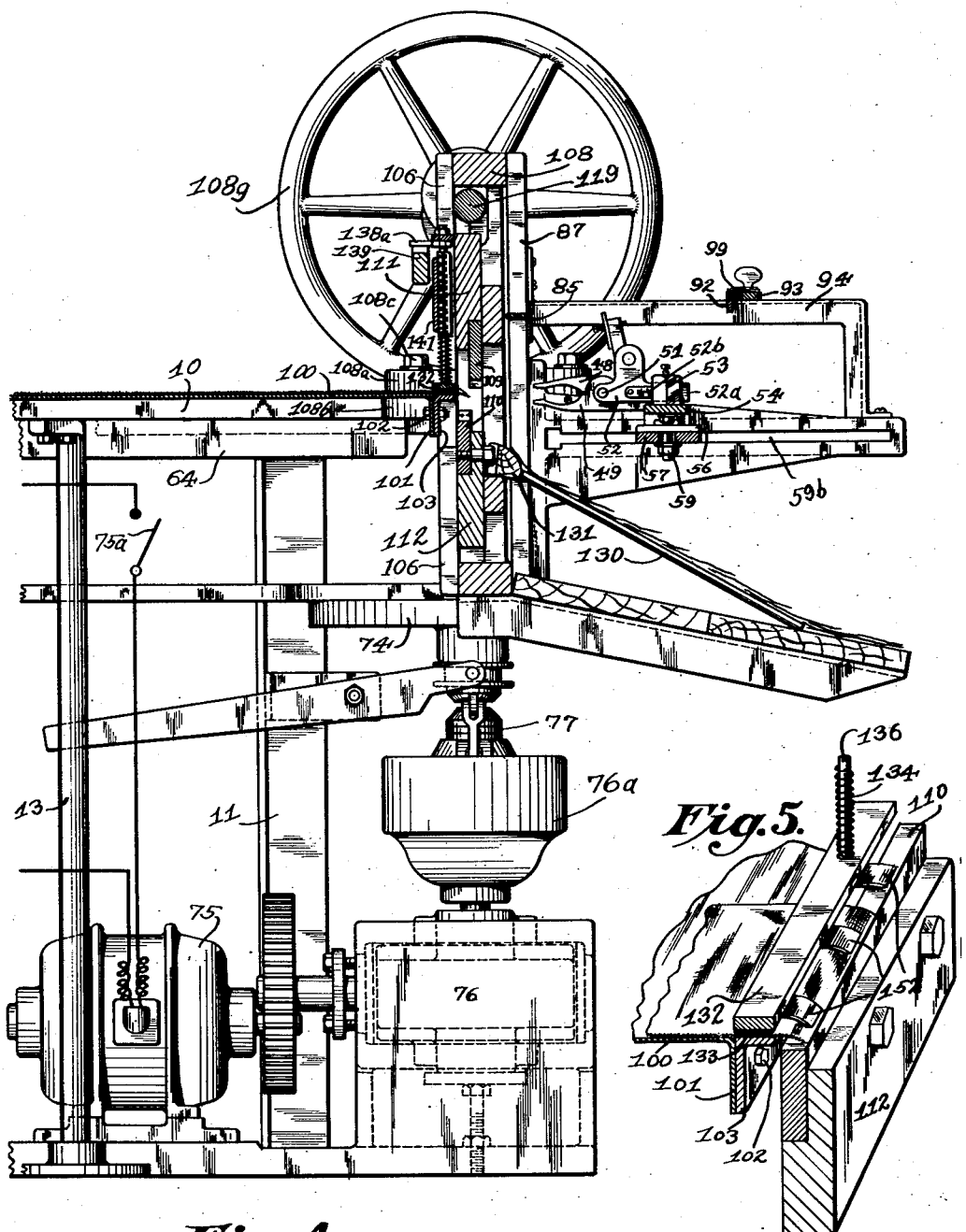
Fig. 4 is a vertical sectional view, taken along the line 4—4 of Fig. 3, looking in the direction of the arrows.
Fig. 5 is a perspective view on an enlarged scale, shown partly in section, of the stripper and grip bar, and the lower shearing knife blade.

In order to support the strips 20, 21, 22, and 23 at the forward part of the main table 10, provision is made of a triangular adjustable segment plate 100 having a depending flange 101 at its forward edge (see Figs. 4 and 5). The flange 101 is secured as by bolts 102 to a stripper supporting angle bar 103.

Figure 2:
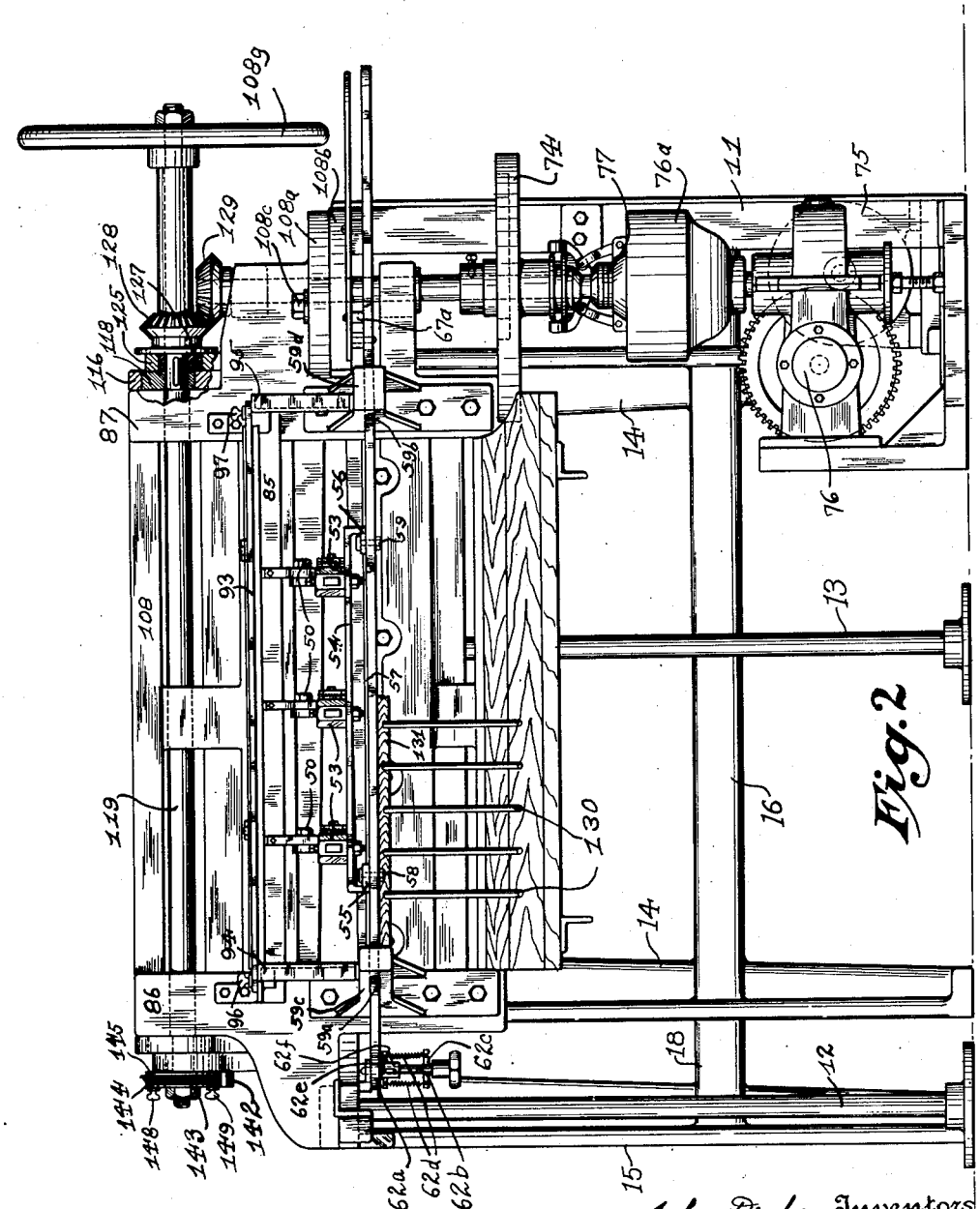
Fig. 2 is a front elevation of the same with certain parts broken away for clearness.

The bar 103 is attached at its ends as by bolts 104 and 105 to a pair of rear end plates 106 and 107 of the rectangular cutter housing, generally indicated by the numeral 108. The right-hand portion of the cutter-housing 108, as viewed in Fig. 2, is provided with a bearing plate 108a having its axis concentric with the shaft 71. The bearing plate 108a rests on a flat bed section 108b integral with the table 10 and is adapted to be secured in adjusted angular position thereon by screw bolts 108c passing through slots 108d and 108e. By means of this construction the cutter housing may be swung rearwardly about its axis from the right-angle position shown in Fig. 3 to the edge of the cut-out section 108f of the table 10. A hand wheel 108g is provided to facilitate the initial adjustment of the machine.

The cutter mechanism consists of a pair of rectangular shearing knives 109 and 110 secured to a pair of bars 111 and 112 respectively and arranged in oppositely inclined positions so as to produce a gradual shearing action when said bars are moved against the strips.

The bars 111 and 112 are slidably guided within the upper and lower sections of the cutter housing 108 by the rear end plates 106 and 107. The upper sliding bar 111 has a pair of outwardly-extending pins 113 and 114 on its extremities, said pins being connected respectively to a pair of links 115 and 116, the upper ends of which are fitted over a pair of eccentrics 117 and 118 keyed on a horizontal shaft 119 journaled at its ends in the cutter housing 108. The lower sliding bar 112 has a pair of outwardly-extending pins 120 and 121 which are of substantially twice the length as said upper pins 113 and 114, and spacing collars 122 and 123 are located on said lower pins as shown in Fig. 6.

The lower pins 120 and 121 are connected respectively to a pair of elongated links 124 and 125 which in turn have their upper ends fitted over a pair of eccentrics 126 and 127 keyed on said shaft 119 at points separated at 180 degrees from the eccentrics 117 and 118. The shaft 119 has a bevel gear 128 at one end driven by a bevel gear 129 mounted upon the top of the vertical main driving shaft 71.

By means of this construction, rotation of the shaft 119 will cause the shearing knives 109 and 110 to move toward each other, the feeding mechanism being so timed that during the strip cutting operation the finger grip jaws 48 and 49 will have released the free ends of the plurality of strips so that said strips will not be under tension.

*Grip and stripper mechanism*

As soon as the finger grip mechanism has pulled the strips forward the proper distance along the table 10 and segment plate 100, the safety tripping bar 92 will release said strips, allowing their free edges to drop down upon the inclined teeth 130 of the rack 131 secured at the front of the cutter housing 108.

Before performing the actual cutting of the short lengths from the ends of the plurality of strips, it is necessary to clamp the sections of the superposed strips behind the cutting knives 109 and 110. For this purpose, provision is made of a horizontal stripper bar 132 having a felt pad 133 secured beneath it for preventing injury to the strips being cut.

The stripper bar 132 is adapted to be pressed downwardly at all times by a pair of coiled springs 134 and 135 located on a pair of vertical rods 136 and 137, the upper ends of which are joined by a cross-bar 138 having a laterally-extending pin 138a at its center, adapted to be slidably engaged by the upper end of a stripper-operating lever 139, pivoted at 140 to a cross-plate 141. The outer end of the lever 139 has a roller 142 journaled thereon and is adapted to engage an adjustable cam 143 bolted to the end of the cutter-operating shaft 119.

As clearly shown in Figs. 8 and 9, the adjustable cam 143 comprises a pair of circular end plates 144 and 145, the outside plate 144 having a pair of diametrically opposed arc-shaped slots 146 and 147 within which a pair of thumb-screws 148 and 149 are fitted, said thumb-screws being screwed into the inside plate 145. Located between the end plates 144 and 145 are a plurality, seven in this instance, of inner plates 150 also provided with slots which aline with the slots 146 and 147. The inner plates 150 have protruding ears 151, the edges of which are adapted to lie flush with one another as shown in Fig. 8. By means of this construction, the cam projection formed by said adjoining ears may be varied in length to produce any desired timing of the stripper bar 132.

In order to cause the stripper bar 132 to yield slightly prior to the cutting operation, said bar is provided with a plurality of forwardly - extending downwardly - curved tongues 152, the curvature of which varies according to the distance from the lower inclined shear knife 110.

Initially, the stripper bar 132 engages the superposed strips at a point slightly behind the cutting line, but as the lower shearing knife 110 rises, the stripper bar 132 will be lifted, transferring the clamping action from said bar to the ends of the tongues 152. This produces a resilient yielding stripping action avoiding all danger of slipping or stretching the edges of the strips.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new and for which it is desired to secure Letters Patent, is:

1. In a machine for cutting off short lengths of strips of flexible material, a receptacle for the original uncut strips, a table, a cutter mechanism at the front of said table, means for intermittently pulling said strips along said table through said cutter mechanism, means to intermittently operate said cutter mechanism, and stripper mechanism for holding said strips adjacent the line of cut during the cutting operation, said cutter mechanism comprising upper and lower reciprocating shearing knives, said stripper mechanism comprising a horizontal spring-pressed stripper bar having resilient tongues in the path of said lower shearing knife and adapted to be raised thereby to transfer the clamping action from said bar to said tongues whereby the tearing of said strips will be avoided.

2. In a machine for cutting off short lengths from strips of flexible material, a table, a stationary cutter mechanism at one end of said table, means for intermittently pulling said strips along said table through said cutter mechanism, said strip pulling mechanism comprising a bar, strip clamps on said bar, rear stationary means extending across said table in the path of said clamps to close said clamps prior to the forward pulling motion of said bar, forward stationary means extending across said table to open said clamps to release said strips at the end of said forward motion, and stripper mechanism to hold said strips adjacent the line of cut during the cutting operation.

3. In a machine for cutting off short lengths from strips of flexible material, a table, a stationary cutter mechanism at one end of said table, means for intermittently pulling said strips along said table through said cutter mechanism, said strip pulling mechanism comprising a bar, strip clamps on said bar, a rear stationary bar extending across said table in the path of said clamps to close said clamps prior to the forward pulling motion of said bar, forward stationary means extending across said table to open said clamps to release said strips at the end of said forward motion, and stripper mechanism to hold said strips adjacent the line of cut during the cutting operation, each of said strip clamps comprising a pair of pivotally connected finger gripping jaws.

4. In a machine for cutting off short lengths from strips of flexible material, a table, a stationary cutter mechanism at one end of said table, means for intermittently pulling said strips along said table through said cutter mechanism, said strip pulling mechanism comprising a bar extending across said table, strip clamps on said bar, rear stationary means extending across said table in the path of said clamps to close said clamps prior to the forward pulling motion of said bar, forward stationary means to open said clamps to release said strips at the end of said forward motion, stripper mechanism to hold said strips adjacent the line of cut during the cutting operation, each of said strip clamps comprising a pair of pivotally connected finger gripping jaws, spring means for normally holding said jaws in open position, and means for adjusting the angular position of said strip pulling means independently of said cutter mechanism.

5. In a machine for cutting off short lengths from strips of flexible material, a table, a stationary cutter mechanism at one end of said table, means for intermittently pulling said strips along said table through said cutter mechanism, said strip pulling mechanism comprising a bar extending across said table, strip clamps on said bar, rear stationary means extending across said table in the path of said clamps to close said clamps prior to the forward pulling motion of said bar, forward stationary means to open said clamps to release said strips at the end of said forward motion, stripper mechanism to hold said strips adjacent the line of cut during the cutting operation, each of said strip clamps comprising a pair of pivotally connected spring-pressed finger gripping jaws, and a rock lever carried by said bar for engaging said rear stationary means to close said jaws upon said strips.

6. In a machine for cutting off short lengths from strips of flexible material, a table, a stationary cutter mechanism at one end of said table, means for intermittently pulling said strips along said table through said cutter mechanism, said strip pulling mechanism comprising a bar extending across said table, strip clamps on said bar, rear stationary means extending across said table in the path of said clamps to close said clamps prior to the forward pulling motion of said bar, forward stationary means to open said clamps to release said strips at the end of said forward motion, stripper mechanism to hold said strips adjacent the line of cut during the cutting operation, each of said strip clamps comprising a pair of pivotally connected spring-pressed finger gripping jaws, and a rock lever carried by said bar for engaging said rear stationary means to close said jaws upon said strips, said rock lever having a roller positioned between the opposite arms of said jaws at the other side of its pivotal connection.

7. In a machine for cutting off short lengths from strips of flexible material, cutting mechanism, a strip clamp for pulling said strip forward into cutting position into alinement with the cutting mechanism comprising a pair of pivotally connected jaws, a rocker for engaging the rear ends of said jaws beyond the pivotal connection, means to reciprocate said strip clamp, means to close said jaws upon said strips at the rearmost position of said clamp, means to lock said rocker for maintaining said jaws in clamping position while said clamp is moving forward, and means to automatically swing said rocker in the reverse direction to unlock said jaws at the forward position of said clamp prior to the cutting operation.

8. In a machine for cutting off short lengths from strips of flexible material, cutting mechanism, a strip clamp for pulling said strip forward into cutting position into alinement with the cutting mechanism comprising a pair of pivotally connected jaws, a rocker for engaging the rear ends of said jaws beyond the pivotal connection, means to reciprocate said strip clamp, means to close said jaws upon said strips at the rearmost position of said clamp, means to lock said rocker for maintaining said jaws in clamping position while said clamp is moving forward, means to automatically swing said rocker in the reverse direction to unlock said jaws at the forward position of said clamp prior to the cutting operation, said rocker reversing means comprising a stationary bar having a rocker engaging strip depending therefrom and hinged thereto, whereby in case the rocker should accidentally pass under said reversing means and thereafter swing to vertical position, it will be permitted to pass rearwardly by the swinging of said strip about its hinge.

9. In a machine for cutting off short lengths from strips of flexible material, a cutter mechanism, means for pulling said strips forwardly into alinement with said cutter mechanism, means to automatically release said pulling mechanism, a stripper for holding said strips adjacent the line of cut, a stripper raising lever, a cam for operating said lever, a vertical driving shaft extending upwardly above the level of said strips at one side of said machine, means for swinging said pulling mechanism, said cutter mechanism, and said stripper mechanism as a unit about said driving shaft as an axis to vary the bias of said short lengths.

10. In a machine for cutting off short lengths from strips of flexible material, a horizontal table, a stationary cutter mechanism at one end of said table, means for intermittently pulling said strips along said table through said cutter mechanism, stripper mechanism for gripping said strips adjacent the line of cut during the cutting operation, means for angularly adjusting said cutter mechanism about an axis on one side of the machine to vary the bias of the strips, and means for adjusting the angular position of said strip pulling mechanism independently of said cutter mechanism.

11. In a machine for cutting off short lengths from a strip of flexible material, a horizontal table for supporting said strip, a cutter mechanism at one end of said table, said cutter mechanism being pivoted on and actuated by means driven from a vertical shaft located at one side of said table, means for pulling said strip along said table into alinement with said cutter mechanism, stripper mechanism to hold said strip behind the line of cut during the cutting operation, and means for angularly adjusting said cutter mechanism about said shaft to vary the bias of said short lengths.

In testimony whereof, we have affixed our signatures to this specification.

JOHN DRAHER.
WILLIAM B. RUNK.